(12) United States Patent
Barker et al.

(10) Patent No.: US 11,447,016 B2
(45) Date of Patent: Sep. 20, 2022

(54) SYSTEM AND METHOD FOR BATTERY PRECONDITIONING BASED ON SELECTED REGENERATIVE BRAKING AMOUNT

(71) Applicant: FORD GLOBAL TECHNOLOGIES, LLC, Dearborn, MI (US)

(72) Inventors: Jonathan Barker, Ann Arbor, MI (US); Kevin Mackenzie, Canton, MI (US); Liam West, Southfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 479 days.

(21) Appl. No.: 16/671,294

(22) Filed: Nov. 1, 2019

(65) Prior Publication Data

US 2021/0129678 A1 May 6, 2021

(51) Int. Cl.
*B60L 7/10* (2006.01)
*B60L 58/26* (2019.01)
*B60L 58/27* (2019.01)
*B60W 30/18* (2012.01)

(52) U.S. Cl.
CPC ............ *B60L 7/10* (2013.01); *B60L 58/26* (2019.02); *B60L 58/27* (2019.02); *B60W 30/18127* (2013.01); *B60K 2370/167* (2019.05); *B60K 2370/169* (2019.05); *B60K 2370/174* (2019.05)

(58) Field of Classification Search
CPC .. B60L 7/10; B60L 58/26; B60L 58/27; B60L 2240/545; B60L 2260/54; B60L 2260/56; B60W 30/18127; B60W 10/26; B60W 20/00; B60W 50/085; B60K 2370/174; Y02T 10/72

See application file for complete search history.

(56) References Cited

U.S. PATENT DOCUMENTS

| | | | |
|---|---|---|---|
| 8,620,506 B2 | 12/2013 | Kummer et al. | |
| 8,753,762 B2 * | 6/2014 | Major | B60H 1/00385 62/238.7 |
| 9,963,038 B2 * | 5/2018 | Parra Ortiz | B60L 53/50 |
| 11,084,398 B2 * | 8/2021 | Marcicki | H01M 10/63 |
| 2012/0138395 A1 | 6/2012 | Curtis et al. | |
| 2012/0225341 A1 * | 9/2012 | Major | B60L 3/003 429/120 |
| 2012/0297809 A1 * | 11/2012 | Carpenter | B60L 58/26 62/239 |
| 2014/0277869 A1 * | 9/2014 | King | H01M 10/443 701/22 |
| 2015/0013367 A1 * | 1/2015 | Carpenter | H01M 10/613 62/222 |
| 2016/0318370 A1 * | 11/2016 | Rawlinson | B60H 1/32281 |
| 2016/0368390 A1 * | 12/2016 | Yang | B60L 1/14 |

(Continued)

*Primary Examiner* — Mussa A Shaawat
(74) *Attorney, Agent, or Firm* — Brooks Kushman PC; David Kelley (57) ABSTRACT

An electrified vehicle includes a traction battery and a battery thermal control system. A controller is configured to receive an initial regenerative braking capability and operation the battery thermal control system to precondition the traction battery during a charge event to a temperature that corresponds to the initial regenerative braking capability such that, during a subsequent drive cycle, the regenerative braking capability is at least equal to the initial regenerative braking capability for at least a predetermined duration into the subsequent drive cycle.

20 Claims, 3 Drawing Sheets

(56) References Cited

U.S. PATENT DOCUMENTS

| | | | |
|---|---|---|---|
| 2017/0125858 A1* | 5/2017 | Miller | H01M 10/625 |
| 2017/0129359 A1* | 5/2017 | Dunlap | B60L 53/14 |
| 2017/0358833 A1* | 12/2017 | Jalilevand | B60H 1/00885 |
| 2019/0001833 A1* | 1/2019 | Coburn | B60L 53/60 |
| 2019/0044119 A1* | 2/2019 | Fernandez-Galindo | H01M 10/0413 |
| 2019/0047427 A1* | 2/2019 | Pogorelik | B60L 53/665 |
| 2019/0070924 A1 | 3/2019 | Mancini et al. | |
| 2019/0165591 A1* | 5/2019 | Kisacikoglu | H02M 3/1582 |
| 2019/0217721 A1* | 7/2019 | Marcicki | H01M 10/625 |
| 2019/0217732 A1* | 7/2019 | Zhou | B60L 53/16 |
| 2019/0221899 A1* | 7/2019 | Tomai | B60L 3/0023 |
| 2020/0076029 A1* | 3/2020 | Litz | B60H 1/143 |
| 2020/0184499 A1* | 6/2020 | Lee | B60L 53/67 |
| 2020/0223280 A1* | 7/2020 | Schoeneman | H01M 10/6571 |

\* cited by examiner

SYSTEM AND METHOD FOR BATTERY PRECONDITIONING BASED ON SELECTED REGENERATIVE BRAKING AMOUNT

TECHNICAL FIELD

This application generally relates to a system for preconditioning a vehicle battery to achieve a selected amount of regenerative braking during a drive cycle after charging.

BACKGROUND

Electrified vehicles offer extended range and/or fuel economy when charged between drive cycles. Charging offers features not available to traditional powertrain vehicles. For example, electrical energy can be used to prepare the vehicle cabin for an upcoming trip. The operator may set a departure time and a vehicle cabin temperature setpoint. The system can then precondition the cabin to be at the temperature setpoint at the departure time. This strategy reduces the amount of energy needed during the drive cycle.

SUMMARY

An electrified vehicle includes a traction battery and a battery thermal system configured to heat and cool the traction battery. The electrified vehicle includes a user interface configured to receive a user entry defining an initial regenerative braking capability for a next drive cycle. The electrified vehicle includes a controller programmed to operate a braking system to incorporate regenerative braking up to a regenerative power capability that is based on operating conditions of the traction battery during a drive cycle, and responsive to the electrified vehicle being connected to an external charger, operate the battery thermal system prior to a start of the next drive cycle to precondition the traction battery to a predetermined temperature corresponding to the initial regenerative braking capability such that the regenerative power capability is at least equal to the initial regenerative braking capability for a predetermined duration into the next drive cycle.

The initial regenerative braking capability may be entered as a percentage of a maximum regenerative braking capability. The initial regenerative braking capability may be entered as a plurality of discrete levels. The controller may be further programmed to estimate a cost associated with preconditioning the traction battery to the predetermined temperature and outputting the cost to the user interface for display. The controller may be further programmed to estimate a percentage range increase associated with preconditioning the traction battery to the predetermined temperature and outputting the percentage to the user interface for display. The user interface may be further configured to receive a user entry of a departure time for the next drive cycle. The controller may be further programmed to estimate a preconditioning start time at which the battery thermal system can cause a temperature of the traction battery to achieve the predetermined temperature before the start of the next drive cycle, and start operating the battery thermal system at the preconditioning start time. The preconditioning start time may be based on an ambient temperature and a traction battery temperature. The controller may be further programmed to, responsive to a traction battery temperature being less than the predetermined temperature, operate the battery thermal system to heat the traction battery. The controller may be further programmed to, responsive to a traction battery temperature corresponding to a regenerative braking capability that exceeds the initial regenerative braking capability, inhibit operation of the battery thermal system.

A method includes receiving, by a controller, an initial regenerative braking capability of a vehicle for a subsequent drive cycle. The method includes responsive to an external charger being coupled to vehicle, operating, by the controller, a thermal control system for a traction battery using energy from the external charger to precondition the traction battery to a predetermined temperature corresponding to the initial regenerative braking capability prior to a subsequent drive cycle such that a regenerative braking capability of the vehicle is at least equal to the initial regenerative braking capability for a predetermined duration into the subsequent drive cycle.

The method may further include estimating, by the controller, a cost associated with preconditioning the traction battery and outputting the cost to a user interface. The method may further include estimating a percentage range increase associated with preconditioning the traction battery and outputting the percentage range increase to a user interface. The method may further include estimating a preconditioning start time at which the thermal control system can cause a temperature of the traction battery to achieve the predetermined temperature before a start of the subsequent drive cycle, and initiating operation of the thermal control system at the preconditioning start time. The method may further include, responsive to a traction battery temperature corresponding to regenerative braking capability that exceeds the initial regenerative braking capability, inhibiting operation of the thermal control system.

A battery thermal control system for a vehicle includes a heating element configured to provide heat to a traction battery and a cooling element configured to cool a traction battery. The battery thermal controls system includes a controller programmed to receive an initial regenerative braking capability or a subsequent drive cycle entered by a user of the vehicle and, responsive to the traction battery being charged from an external charger, operate the heating element and the cooling element to precondition the traction battery to a predetermined temperature corresponding to the initial regenerative braking capability prior to a start of the subsequent drive cycle.

The controller may be further programmed to estimate a preconditioning start time at which the heating element and the cooling element can be operated to cause a temperature of the traction battery to achieve the predetermined temperature before the start of the subsequent drive cycle, and start operating the heating element and the cooling element at the preconditioning start time. The preconditioning start time may be based on an ambient temperature and a traction battery temperature. The controller may be further programmed to, responsive to a traction battery temperature being less than the predetermined temperature, operate the heating element to heat the traction battery. The controller may be further programmed to, responsive to a traction battery temperature corresponding to regenerative braking capability that exceeds the initial regenerative braking capability, inhibit operation of the heating element and the cooling element.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

An electrified vehicle may incorporate regenerative braking using electric machines to recover energy during braking events. The amount of regenerative braking may depend on the temperature of the battery. For example, at low temperatures, the capacity of the battery to receive energy may be low. As such, it may be desirable to maintain the battery at a temperature that allows a desired initial amount of regenerative braking. Further, it may be desired to use external energy to bring the battery up to the temperature during a charge event. The system disclosed herein allows preconditioning of the battery up to an operator-selected value to ensure that an operator-entered amount of regenerative braking is available at the start of a drive cycle.

Figure 1:
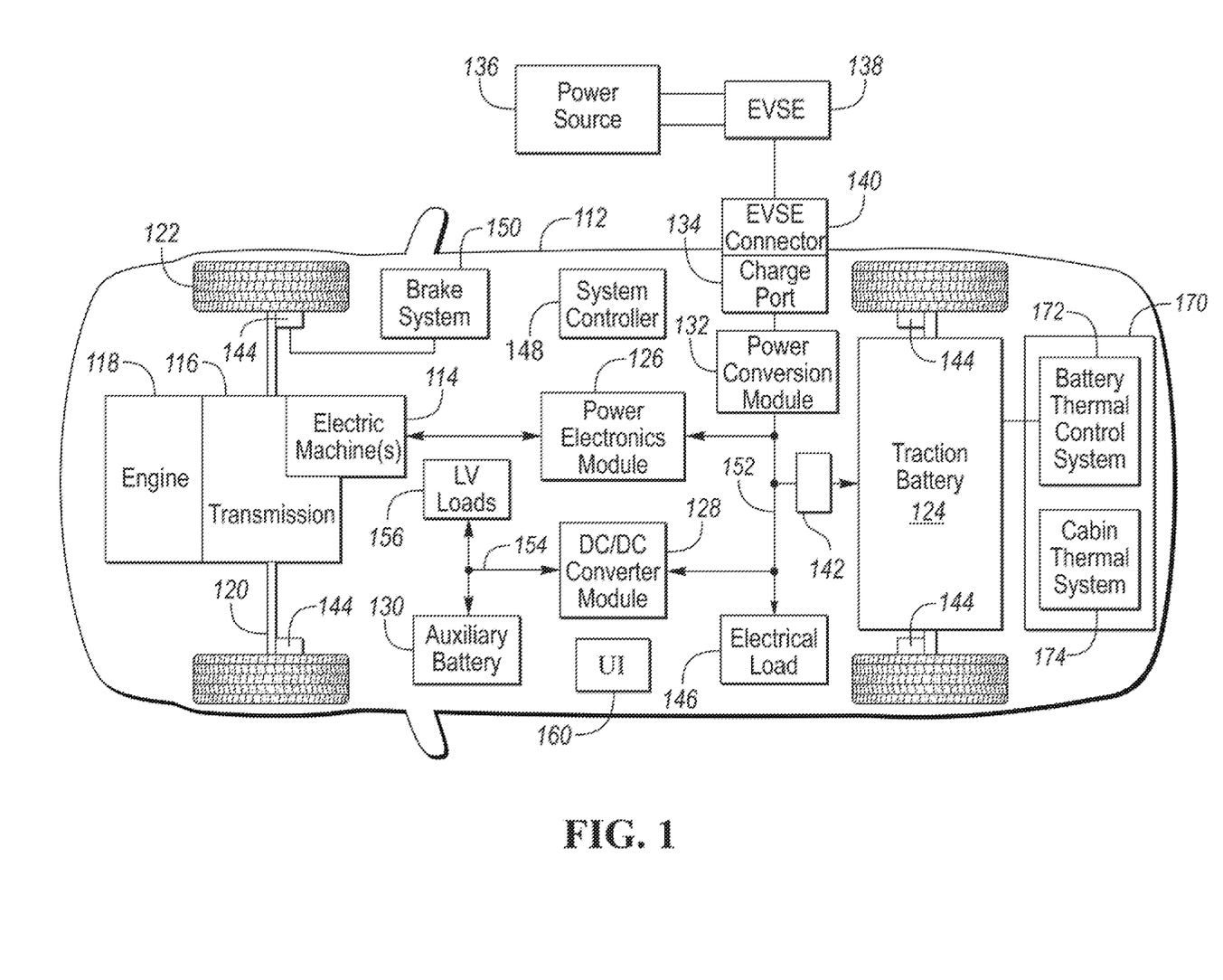
FIG. 1 depicts a possible configuration for an electrified vehicle.

FIG. 1 depicts an electrified vehicle 112 that may be referred to as a plug-in hybrid-electric vehicle (PHEV). A plug-in hybrid-electric vehicle 112 may comprise one or more electric machines 114 mechanically coupled to a gearbox or hybrid transmission 116. The electric machines 114 may be capable of operating as a motor and a generator. In addition, the hybrid transmission 116 is mechanically coupled to an engine 118. The hybrid transmission 116 is also mechanically coupled to a drive shaft 120 that is mechanically coupled to the wheels 122. The electric machines 114 can provide propulsion and regenerative braking capability when the engine 118 is turned on or off. The electric machines 114 may also act as generators and can provide fuel economy benefits by recovering energy that would normally be lost as heat in a friction braking system. The electric machines 114 may also reduce vehicle emissions by allowing the engine 118 to operate at more efficient speeds and allowing the electrified vehicle 112 to be operated in electric mode with the engine 118 off under certain conditions. An electrified vehicle 112 may also be a battery electric vehicle (BEV). In a BEV configuration, the engine 118 may not be present.

A battery pack or traction battery 124 stores energy that can be used by the electric machines 114. The traction battery 124 may provide a high voltage direct current (DC) output. A contactor module 142 may include one or more contactors configured to isolate the traction battery 124 from a high-voltage bus 152 when opened and connect the traction battery 124 to the high-voltage bus 152 when closed. The high-voltage bus 152 may include power and return conductors for carrying current over the high-voltage bus 152. The contactor module 142 may be located in the traction battery 124.

One or more power electronics modules 126 (also known as an inverter) may be electrically coupled to the high-voltage bus 152. The power electronics modules 126 are also electrically coupled to the electric machines 114 and provide the ability to bi-directionally transfer energy between the traction battery 124 and the electric machines 114. For example, a traction battery 124 may provide a DC voltage while the electric machines 114 may operate with a three-phase alternating current (AC) to function. The power electronics module 126 may convert the DC voltage to a three-phase AC current to operate the electric machines 114. In a regenerative mode, the power electronics module 126 may convert the three-phase AC current from the electric machines 114 acting as generators to the DC voltage compatible with the traction battery 124.

In addition to providing energy for propulsion, the traction battery 124 may provide energy for other vehicle electrical systems. The vehicle 112 may include a DC/DC converter module 128 that converts the high voltage DC output from the high-voltage bus 152 to a low-voltage DC level of a low-voltage bus 154 that is compatible with low-voltage loads 156. An output of the DC/DC converter module 128 may be electrically coupled to an auxiliary battery 130 (e.g., 12V battery) for charging the auxiliary battery 130. The low-voltage loads 156 may be electrically coupled to the auxiliary battery 130 via the low-voltage bus 154. One or more high-voltage electrical loads 146 may be coupled to the high-voltage bus 152. The high-voltage electrical loads 146 may have an associated controller that operates and controls the high-voltage electrical loads 146 when appropriate. Examples of high-voltage electrical loads 146 may be a fan, an electric heating element and/or an air-conditioning compressor.

The electrified vehicle 112 may be configured to recharge the traction battery 124 from an external power source 136. The external power source 136 may be a connection to an electrical outlet. The external power source 136 may be electrically coupled to a charge station or electric vehicle supply equipment (EVSE) 138. The external power source 136 may be an electrical power distribution network or grid as provided by an electric utility company. The EVSE 138 may provide circuitry and controls to regulate and manage the transfer of energy between the power source 136 and the vehicle 112. The external power source 136 may provide DC or AC electric power to the EVSE 138. The EVSE 138 may have a charge connector 140 for coupling to a charge port 134 of the vehicle 112. The charge port 134 may be any type of port configured to transfer power from the EVSE 138 to the vehicle 112. The charge port 134 may be electrically coupled to an on-board power conversion module or charger. The charger 132 may condition the power supplied from the EVSE 138 to provide the proper voltage and current levels to the traction battery 124 and the high-voltage bus 152. The charger 132 may be electrically coupled to the contactor module 142. The charger 132 may interface with the EVSE 138 to coordinate the delivery of power to the vehicle 112. The EVSE connector 140 may have pins that mate with corresponding recesses of the charge port 134. Alternatively, various components described as being electrically coupled or connected may transfer power using a wireless inductive coupling.

Wheel brakes 144 may be provided for slowing the vehicle 112 and preventing motion of the vehicle 112. The wheel brakes 144 may be hydraulically actuated, electrically actuated, or some combination thereof. The wheel brakes 144 may be a part of a brake system 150. The brake system 150 may include other components to operate the wheel brakes 144. For simplicity, the figure depicts a single connection between the brake system 150 and one of the wheel brakes 144. A connection between the brake system 150 and the other wheel brakes 144 is implied. The brake system 150 may include a controller to monitor and coordinate the brake system 150. The brake system 150 may monitor the brake components and control the wheel brakes 144 for slowing the vehicle. The brake system 150 may respond to driver commands and may also operate autonomously to implement features such as stability control. The controller of the brake system 150 may implement a method of applying a requested brake force when requested by another controller or sub-function.

Electronic modules in the vehicle 112 may communicate via one or more vehicle networks. The vehicle network may include a plurality of channels for communication. One channel of the vehicle network may be a serial bus such as a Controller Area Network (CAN). One of the channels of the vehicle network may include an Ethernet network defined by Institute of Electrical and Electronics Engineers (IEEE) 802 family of standards. Additional channels of the vehicle network may include discrete connections between modules and may include power signals from the auxiliary battery 130. Different signals may be transferred over different channels of the vehicle network. For example, video signals may be transferred over a high-speed channel (e.g., Ethernet) while control signals may be transferred over CAN or discrete signals. The vehicle network may include any hardware and software components that aid in transferring signals and data between modules. The vehicle network is not shown in FIG. 1, but it may be implied that the vehicle network may connect to any electronic modules that are present in the vehicle 112. A vehicle system controller (VSC) 148 may be present to coordinate the operation of the various components.

The electrified vehicle 112 may further include a user interface 160. The user interface 160 may provide a variety of display elements for communicating information to the operator. The user interface 160 may provide a variety of input elements for receiving information from the operator. The user interface 160 may include one or more displays. The displays may be touch-screen displays. The user interface 160 may include discrete lamps/lights. For example, the lamps may include light-emitting diodes (LED). The user interface 160 may include switches, rotary knobs, and buttons for allowing the operator to change various settings. The user interface 160 may include a control module that communicates via the vehicle network. The user interface 160 may provide one or more display elements that are indicative of charging being inhibited and vehicle operation being inhibited. The user interface 160 may also provide display elements for indicating a status of the contactor module 142. The display elements may include discrete lamps and/or messages in a message display area. The user interface 160 may also include a diagnostic terminal that permits access to stored controller data using a diagnostic tool or other device. For example, the diagnostic terminal may allow the user or technician to retrieve diagnostic codes that are stored in the vehicle controllers. The user interface 160 may include knobs, switches, buttons, and other input elements for providing input selections. The input elements may work in conjunction with the display elements and/or may work independently from the display elements.

The electrified vehicle 112 may further include a thermal system 170 that is configured to regulate the temperature of a cabin environment and temperatures of vehicle components. The thermal system 170 may include a battery thermal control system 172 that is configured to regulate and manage the temperature of the traction battery 124. The battery thermal control system 172 may be configured to heat and cool the traction battery 124 to cause a temperature of the traction battery 124 to achieve a temperature setpoint. The thermal system 170 may include a cabin thermal system 174 that is configured to manage the environmental conditions within the cabin of the vehicle 112. The thermal system 170 may include common components for heating and cooling the various systems. In other configurations, the battery thermal controls system 172 and the cabin thermal system 174 may be comprised of separate components. The thermal system 170 is discussed in more detail below.

Figure 2:
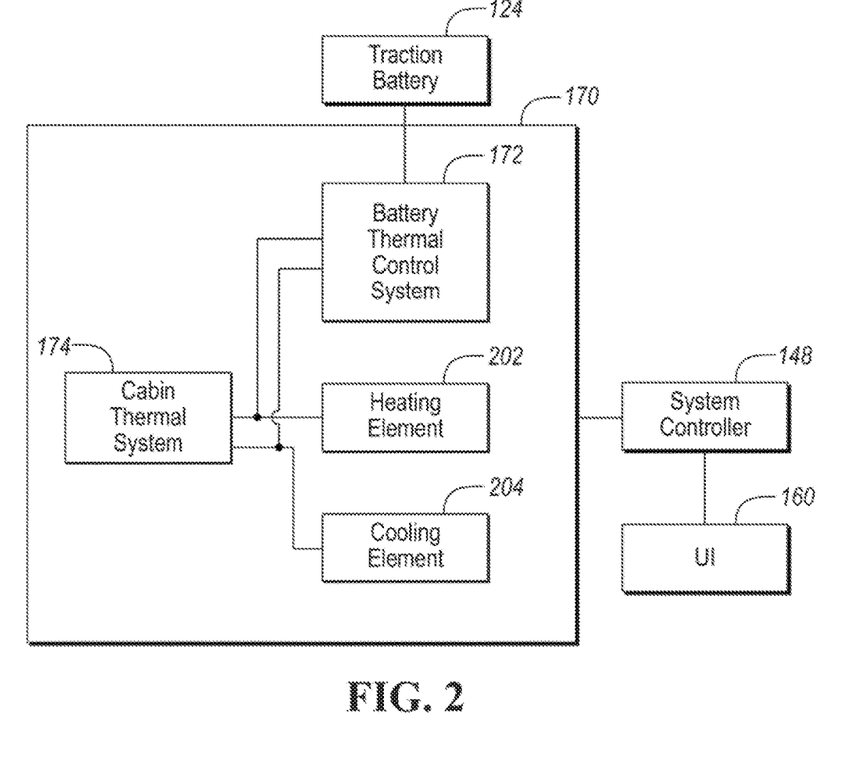
FIG. 2 depicts a possible block diagram for a thermal control system for the electrified vehicle.

FIG. 2 depicts a possible high-level block diagram including the thermal system 170. The thermal control system 170 may include at least one heating element 202 and at least one cooling element 204. The heating element 202 may include an electric heater. The cooling element 204 may include a radiator. The cooling element 204 may include an air conditioning (A/C) system including associated components. The traction battery 124 may be liquid cooled. The thermal system 170 may cause coolant to flow through the traction battery 124. As the coolant flows through conduits within the traction battery 124, heat may be exchanged between the battery components and the coolant.

The battery thermal control system 172 may include pumps and conduits for flowing coolant through the traction battery 124. In addition, the battery thermal control system 172 may include valves for directing coolant flow through the conduits. The battery thermal control system 172 may include one or more temperature sensors for measuring coolant and traction battery temperatures. The traction battery 124 may include one or more temperature sensors that provide temperature data for the traction battery 124. The temperature sensors may provide a signal to the battery thermal control system 172 and/or the system controller 148 for control and monitoring purposes. The battery thermal system 172 may be configured to operate the heating element 202 and/or the cooling element 204 to regulate temperature of the coolant.

The cabin thermal system 174 may include components for managing the cabin environment. The cabin thermal system 174 may include components for providing air to the cabin at a desired temperature. The cabin thermal system 174 may include components for exchanging heat between the coolant and the cabin environment. The cabin thermal system 174 may include one or more heat exchangers, fans and vents to direct airflow into the cabin.

The cabin thermal system 174 and the battery thermal control system 172 may share coolant with other systems in the vehicle. The coolant may also flow through other components such as the electric machines 114. The heating element 202 and the cooling element 204 may be operated to drive the coolant to a selected temperature. The thermal system 170 may be operable during charging and drive cycles. A drive cycle may be defined as an operational cycle following a key on event. For example, a key may be inserted into an ignition switch and turned to a run position.

In other examples, a start button may be pressed to enable propulsion. A charging cycle may be defined as period of time during which an external charger (e.g., EVSE 138) is coupled to the vehicle such that battery charging is possible. Operation of the thermal system 170 during drive cycles and charge events may be different. For example, during drive cycles, the thermal system 170 may receive heat from operating components such as the electric machines 114 that may be inactive during charging.

The system controller 148 may be programmed to manage operation of the battery thermal control system 172 during charging events and drive cycles. The system controller 148 may be configured to manage regenerative braking capability. The electrified vehicle 112 may utilize braking torque of the electric machines 114 to achieve vehicle braking. During regenerative braking, the electric machines 114 are operated as generators and can supply energy to the traction battery 124 that is stored for later use. The use of regenerative braking allows energy to be recovered and reused and improves range and/or fuel economy of the vehicle. The amount of regenerative braking available at any given time depends on a number of factors.

Some factors relate to parameters of the electric machines 114. For example, rotor speed and temperature may affect the amount of regenerative power that can be delivered by the electric machines 114. Some factors may relate to the traction battery 124. Battery temperature may impact the amount of energy that the traction battery 124 can store. In general, as the battery temperature decreases, less energy can be accepted by the traction battery 124. As such, the regenerative braking capability of the vehicle may be reduced in cold temperatures. The regenerative braking capability may refer to the amount of power that may be received by the traction battery 124 during a regenerative braking event. The amount of power that may be received may be reduced as temperature decreases.

As electrified vehicles 112 utilize regenerative braking, it is possible that the performance may vary with temperature. For example, at relatively warm temperatures, full regenerative braking capability may be permitted. At extreme low temperatures, regenerative braking capability may be significantly reduced. The vehicle operator may notice a difference in braking feel due to the regenerative braking capability being replaced by friction braking. In addition, there may be some range and/or fuel economy impacts that are noticed. For example, at low temperatures, the traction battery 124 may not recover as much regenerative energy as at higher temperatures. Energy not recovered may be lost as heat in the friction braking system and result in decreased range or fuel economy. A particular concern may be the performance at the start of a drive cycle. Over the course of the drive cycle, the temperature of the traction battery 124 may increase as current flows in and out of the traction battery 124. Temperature changes of the traction battery 124 during the drive cycle can cause a change in the regenerative power capability of the traction battery 124. As such, the operator may notice a change in performance over the course of the drive cycle. To reduce these performance variations, it may be desirable to make the regenerative power capability over the drive cycle as consistent as possible.

For plug-in electrified vehicles, it is possible to precondition the traction battery 124 to a preferred temperature during a charge event. When the vehicle is plugged into the EVSE 138, energy from the power source 136 can be used to heat or cool the traction battery 124. The cost of the preconditioning may be evaluated as the electricity cost for the electrical energy provided for preconditioning. Since there is a cost for preconditioning, the customer should be permitted to control the cost.

Figure 3:
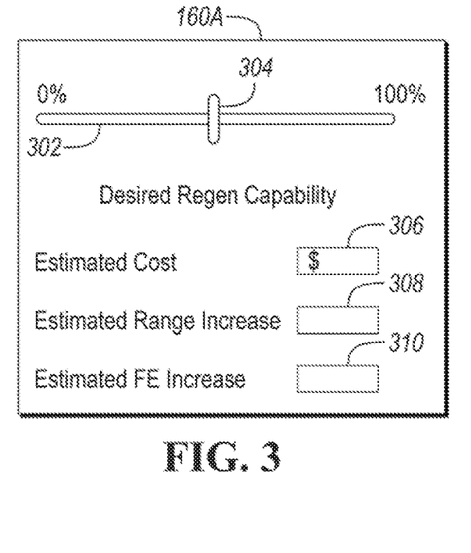
FIG. 3 depicts a possible interface for setting initial regenerative braking capability.

The user interface 160 may include a touch screen. The user interface 160 may display an interface to permit user entry of an initial regenerative braking capability selection. The initial regenerative braking capability may be the amount of regenerative braking capability that the user prefers at the start of a next/subsequent drive cycle. FIG. 3 depicts a first example interface. The first example interface includes a scale element 302 and a slider element 304. The scale element 302 may represent the range of possible values for the initial regenerative braking capability. For example, the scale element 302 may be labeled at a first end as 0% and at a second end as 100%. The initial regenerative braking capability may be represented as a percentage of a maximum regenerative braking capability. The slider element 304 may be moved by the operator along the scale element 302 to select an initial regenerative braking capability. For example, when the slider element 304 is positioned in the center of the scale element 302 an initial regenerative braking capability may be set as 50%. The scale element 302 may change linearly between the end points. The scale element 302 and the slider element 304 may be a virtual interface displayed on a touchscreen. In other configurations, the slider element 304 may be a physical sliding element.

The user interface 160 may include an estimated cost display element 306. The estimated cost display element 306 may depict a cost associated with the position of slider element 304. The cost may be expressed in units of currency. The user interface 160 may include an estimated range increase display element 308. The estimated range increase display element 308 may depict a range increase associated with the position of the slider element 304. The range increase may be expressed as a percentage or a distance. The user interface 160 may include an estimated fuel economy increase display element 310. The estimated fuel economy increase display element 310 may depict an increase in fuel economy associated with the position of the slider element 304. The increase in fuel economy may be expressed in distance per volume of fuel (e.g., miles per gallon). The estimated cost display element 306, the estimated range increase display element 308, and the estimate fuel economy increase display element 310 may be included in any example interface discussed herein.

Figure 4:
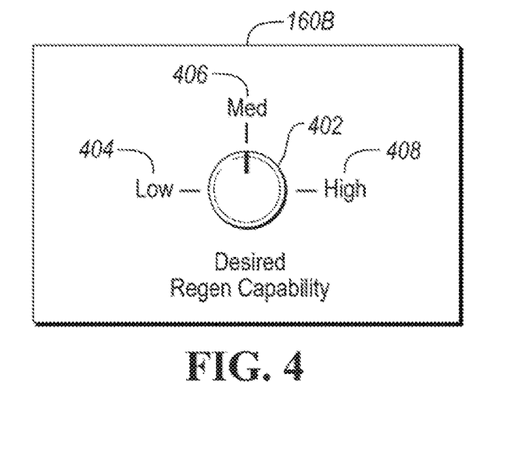
FIG. 4 depicts a possible interface for setting initial regenerative braking capability.

FIG. 4 depicts a second example interface. The second example interface may include a rotary knob element 402. The second example interface may include a first level indicator 404, a second level indicator 406, and a third level indicator 408. For example, the first level indicator 404 may be labeled as "LOW" and may represent a selection of a relatively low amount (e.g., 0%) of initial regenerative braking capability. The second level indicator 406 may be labeled as "MED" and may represent a selection of a moderate amount (e.g., 50%) of initial regenerative braking capability. The third level indicator 408 may be labeled as "HIGH" and may represent a selection of a large amount (e.g., 100%) of initial regenerative braking capability. The operator may rotate the rotary knob element 402 to a position to select the preferred initial amount of regenerative braking capability. The rotary knob element 402 may include a marker to indicate the rotational position. The selected amount of regenerative braking capability may vary linearly as the rotary knob element 402 is rotated. In some configurations, the level indicators may be percentages. The rotary knob element 402 may be a virtual element on the touchscreen or may be a physical knob.

In some configurations, the rotary knob element 402 may be configured to provide discrete values corresponding to the indicator values. In the above example, the rotary knob element 402 may provide three discrete values—"LOW", "MED", and "HIGH". In other configurations, the rotary knob element 402 may be configured to provide a continuous value between a minimum and maximum value. For example, the rotary knob element 402 may be configured to provide a value from 0% to 100%. In these configurations, the rotary knob element 402 may provide a range of values between the indicator values.

All elements described as being included in the user interlace 160 may also be presented on a remote or mobile device. The mobile device may be in communication with the vehicle 112. For example, a vehicle may include a wireless interface module to communicate with a mobile device via Bluetooth or Wifi signals. In other configurations, the wireless interface module may include a cellular communication link. The initial regenerative braking capability may be transferred from the mobile device to the system controller 148. In addition, other parameters described may be entered using the mobile device.

The user interface 160 may store the initial regenerative braking capability value in nonvolatile memory for later use. At the initiation of a charge cycle, the user interface 160 may transfer the initial regenerative braking capability value to the system controller 148 for use during the battery preconditioning operation.

The user interface 160 may also include an interface for setting the desired cabin temperature and an expected departure time. The desired cabin temperature may be used to control the preconditioning of the cabin to achieve the desired cabin temperature before the departure time. The expected departure time may be time entered by the operator. In some configurations, the expected departure time may be learned from historical trip data.

The initial regenerative braking capability may be used to control the preconditioning of the traction battery 124 during charging. The initial regenerative braking capability may be associated with a traction battery temperature that allows the traction battery 124 to achieve the initial regenerative braking capability. A profile of battery charge power capability as a function of battery temperature may be stored in nonvolatile memory. The profile may be developed from simulation and/or experimental data. When the initial regenerative braking capability is entered, the battery temperature corresponding to the initial regenerative braking capability may be extracted from the profile. In some configurations, the profile may be expressed as a formula or equation.

When the electrified vehicle 112 is connected to the EVSE 138, charging of the traction battery 124 is possible. In addition, preconditioning of the traction battery 124 and the cabin is also possible. The system controller 148 may be programmed to evaluate a start time for preconditioning and battery charging. The system controller 148 may determine the start time based on the current state of the components and as an expected state of the components before the departure time. Inputs may include battery state of charge, battery temperature, ambient temperature, and cabin temperature. Charging and preconditioning activities may be expected to be complete at the departure time. A time margin or buffer may be incorporated to compensate for changing conditions.

Figure 5:
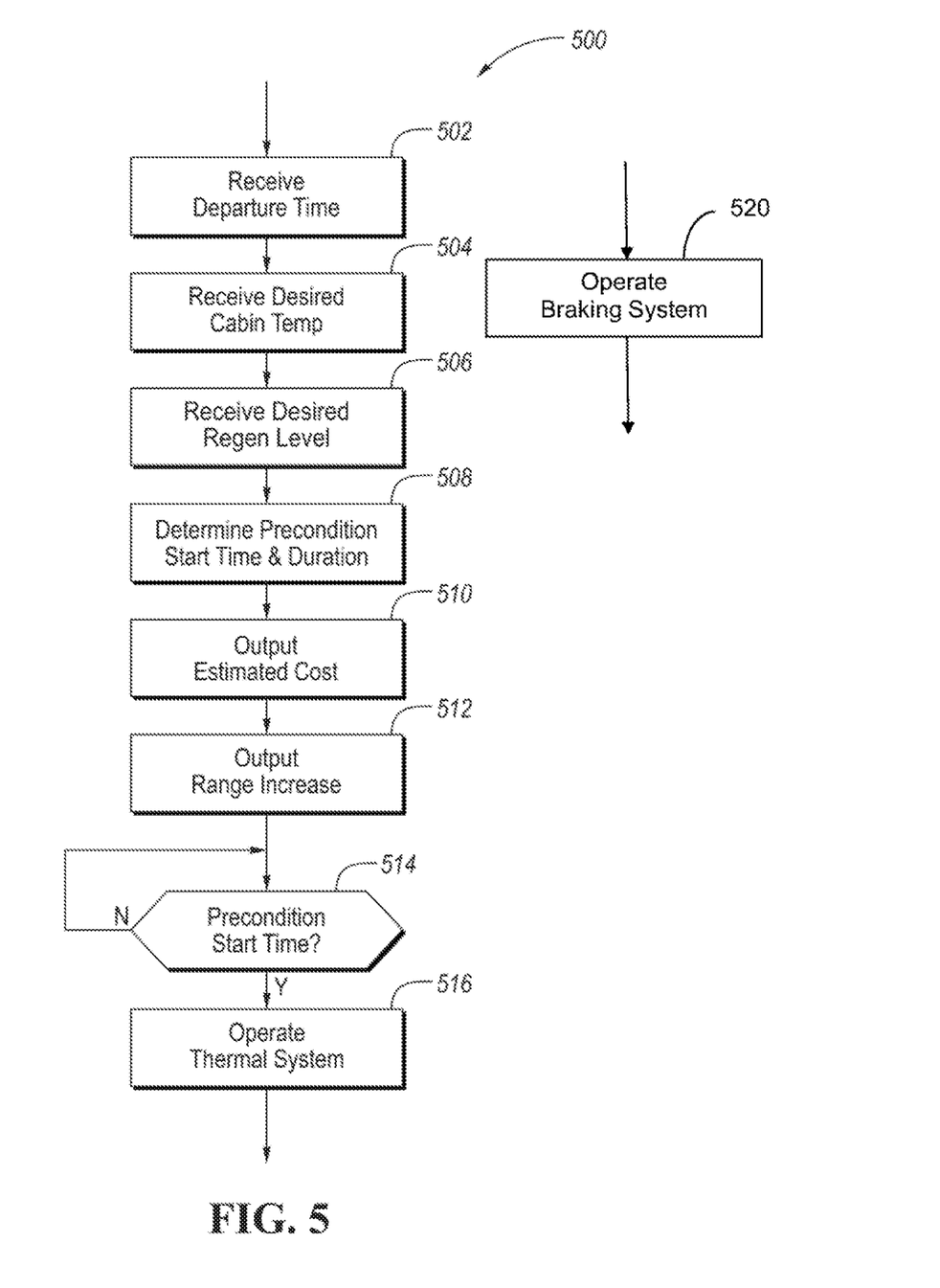
FIG. 5 depicts a possible flow chart for preconditioning a traction battery and vehicle cabin during a charge event.

FIG. 5 depicts a flow chart 500 for a possible sequence of operations that may be implemented in a controller (e.g., system controller 148). Note that in other configurations, the various operations may be completed in a different sequence or at different times than shown. The sequence of operations may be contingent upon being connected to the EVSE 138 and power being available from power source 136. At operation 502, the controller may receive the departure time. The departure time may be entered by the user or learned by the controller using historical trip data. The controller 148 may include and/or have access to a clock element that provides a time and date for the system.

At operation 504, the controller may receive a cabin temperature setpoint. The cabin temperature setpoint may be entered by the user. In some configurations, the cabin temperature setpoint may be inferred based on the control settings of the cabin thermal control system 174 from the last ignition cycle.

At operation 506, the controller may receive an initial regenerative braking level. The initial regenerative braking level may be entered by the user or operator as previously described herein. In some configurations, the initial regenerative braking capability may be received as a percentage of a maximum possible regenerative braking capability. In some configurations, the initial regenerative braking capability may be received as one of a discrete number of levels (e.g., low, medium, high). The initial regenerative braking capability may be used to determine a target battery temperature as described above.

At operation 508, the controller may determine the preconditioning start time and the duration. The preconditioning start time may consider the amount of energy that can be provided by the EVSE 138 to ensure that cabin and battery preconditioning may be completed before the departure time. The preconditioning start time determination may consider the ambient temperature and the battery temperature. For example, a greater difference between the battery temperature and the target battery temperature may require a greater preconditioning duration. The controller may also determine whether sufficient time remains to successfully precondition the battery and cabin. When sufficient time is not available, the controller may output an alert to the operator of the condition.

At operation 510, the controller may determine and output an estimated cost associated with the preconditioning operation. The controller may receive electricity rates via the EVSE 138. In some configurations, the electricity rates may be received via a wireless communication link. The controller may evaluate the amount of energy that is expected be used for preconditioning. For example, amount of energy may be based on the difference in temperature between the traction battery 124 and the target battery temperature. Knowing the amount of energy, the duration of energy usage, and the cost per unit of energy allows the controller to estimate the cost. The controller may evaluate the incremental cost associated with preconditioning the traction battery 124 and output the value to the user interface 160. The controller may also be programmed to evaluate the actual amount of energy used and the actual cost after completion of the preconditioning operation.

At operation 512, the controller may evaluate and output an estimated range increase associated with the battery preconditioning operation. The controller may implement a formula for determining the range impact of the selected energy recovery for a predetermined time into the drive cycle. The range impact may be determined from historical vehicle performance. For example, the controller may monitor the amount of energy lost due to being unable to recover regenerative braking energy. The amount of energy may be equated to a distance. The controller can monitor the amount of energy used and the distance covered and develop a relationship between energy usage and distance.

At operation 514, the controller may monitor for the preconditioning start time. For example, the controller may sample the clock periodically and compare the time to the preconditioning start time. If the preconditioning start time is detected, operation 516 may be performed to operate the thermal system. If the preconditioning start time is not detected, operation 514 may be repeated. In some configurations, the previous operations may be repeated if the preconditioning start time is not detected to allow changes prior to the preconditioning start time.

Operation 516 may operate the thermal control systems to precondition the corresponding subsystems to the temperature setpoint. The initial regenerative braking level may be processed to determine a target battery temperature. The target battery temperature may be compared to a present battery temperature. The controller 148 may operate the heating element 202 or the cooling element 204 to drive the battery temperature to the target battery temperature. The controller 148 may further operate any pumps and valves of the battery thermal control system 172 to achieve the target battery temperature. For example, responsive to a traction battery temperature being less than the predetermined temperature, the controller may activate the heating element 202 to heat the traction battery. Responsive to a traction battery temperature being greater than the predetermined temperature, the controller may activate the cooling element 204 to cool the traction battery. In some configurations, the controller may be programmed to, responsive to the traction battery temperature corresponding to regenerative braking capability that exceeds the initial regenerative braking capability, inhibit operation of the battery thermal system. In this condition, the traction battery 124 may already be capable of providing the initial regenerative braking capability. The controller may operate the battery thermal control system 172 prior to a start of the next/subsequent drive cycle to precondition the traction battery 124 to a predetermined temperature corresponding to the initial regenerative braking capability such that the regenerative power capability is at least equal to the initial regenerative braking capability for a predetermined duration into the next drive cycle.

At operation 520, the controller may operate the braking system 150 to incorporate regenerative braking up to a regenerative power capability that is based on operating conditions of the traction battery 124 during a drive cycle. For example, at the start of the drive cycle, the regenerative power capability may be determined by the starting temperature of the traction battery 124. When the battery preconditioning is successfully completed, the regenerative power capability at the start of the drive cycle may be at least equal to the initial regenerative braking capability that is set by the operator. Operating the braking system 150 may include selecting a proportion of braking effort to be achieved by friction braking and by regenerative braking. Operating the braking system 150 may further include controlling actuators of the friction braking system and controlling the braking torque applied by the electric machines 114.

The battery preconditioning system allows the operator to affect performance and overall cost of the vehicle. The ability to select the initial amount of regenerative braking after charging allows the operator to decide on the performance and cost. The operator may balance overall cost and energy reuse.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs) Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An electrified vehicle comprising:
   a traction battery;
   a battery thermal system configured to heat and cool the traction battery;
   a user interface configured to receive a user entry defining an initial regenerative braking capability for a next drive cycle; and
   a controller programmed to operate a braking system to incorporate regenerative braking up to a regenerative power capability that is based on operating conditions of the traction battery during a drive cycle, and responsive to the electrified vehicle being connected to an external charger, operate the battery thermal system prior to a start of the next drive cycle to precondition the traction battery to a predetermined temperature corresponding to the initial regenerative braking capability such that the regenerative power capability is at least equal to the initial regenerative braking capability for a predetermined duration into the next drive cycle.

2. The electrified vehicle of claim 1, wherein the initial regenerative braking capability is entered as a percentage of a maximum regenerative braking capability.

3. The electrified vehicle of claim 1, wherein the initial regenerative braking capability is entered as a plurality of discrete levels.

4. The electrified vehicle of claim 1, wherein the controller is further programmed to estimate a cost associated with preconditioning the traction battery to the predetermined temperature and outputting the cost to the user interface for display.

5. The electrified vehicle of claim 1, wherein the controller is further programmed to estimate a percentage range increase associated with preconditioning the traction battery to the predetermined temperature and outputting the percentage to the user interface for display.

6. The electrified vehicle of claim 1, wherein the user interface is further configured to receive a user entry of a departure time for the next drive cycle.

7. The electrified vehicle of claim 1, wherein the controller is further programmed to estimate a preconditioning start time at which the battery thermal system can cause a temperature of the traction battery to achieve the predetermined temperature before the start of the next drive cycle, and start operating the battery thermal system at the preconditioning start time.

8. The electrified vehicle of claim 7, wherein the preconditioning start time is based on an ambient temperature and a traction battery temperature.

9. The electrified vehicle of claim 1, wherein the controller is further programmed to, responsive to a traction battery temperature being less than the predetermined temperature, operate the battery thermal system to heat the traction battery.

10. The electrified vehicle of claim 1, wherein the controller is further programmed to, responsive to a traction battery temperature corresponding to a regenerative braking capability that exceeds the initial regenerative braking capability, inhibit operation of the battery thermal system.

11. A method comprising:
receiving, by a controller, an initial regenerative braking capability of a vehicle for a subsequent drive cycle; and
responsive to an external charger being coupled to vehicle, operating, by the controller, a thermal control system for a traction battery using energy from the external charger to precondition the traction battery to a predetermined temperature corresponding to the initial regenerative braking capability prior to a subsequent drive cycle such that a regenerative braking capability of the vehicle is at least equal to the initial regenerative braking capability for a predetermined duration into the subsequent drive cycle.

12. The method of claim 11 further comprising estimating, by the controller, a cost associated with preconditioning the traction battery and outputting the cost to a user interface.

13. The method of claim 11 further comprising estimating a percentage range increase associated with preconditioning the traction battery and outputting the percentage range increase to a user interface.

14. The method of claim 11 further comprising estimating a preconditioning start time at which the thermal control system can cause a temperature of the traction battery to achieve the predetermined temperature before a start of the subsequent drive cycle, and initiating operation of the thermal control system at the preconditioning start time.

15. The method of claim 11 further comprising, responsive to a traction battery temperature corresponding to regenerative braking capability that exceeds the initial regenerative braking capability, inhibiting operation of the thermal control system.

16. A battery thermal control system for a vehicle comprising:
a heating element configured to provide heat to a traction battery;
a cooling element configured to cool a traction battery; and
a controller programmed to receive an initial regenerative braking capability for a subsequent drive cycle entered by a user of the vehicle and, responsive to the traction battery being charged from an external charger, operate the heating element and the cooling element to precondition the traction battery to a predetermined temperature corresponding to the initial regenerative braking capability prior to a start of the subsequent drive cycle.

17. The battery thermal control system of claim 16, wherein the controller is further programmed to estimate a preconditioning start time at which the heating element and the cooling element can be operated to cause a temperature of the traction battery to achieve the predetermined temperature before the start of the subsequent drive cycle, and start operating the heating element and the cooling element at the preconditioning start time.

18. The battery thermal control system of claim 17, wherein the preconditioning start time is based on an ambient temperature and a traction battery temperature.

19. The vehicle of claim 16, wherein the controller is further programmed to, responsive to a traction battery temperature being less than the predetermined temperature, operate the heating element to heat the traction battery.

20. The vehicle of claim 16, wherein the controller is further programmed to, responsive to a traction battery temperature corresponding to regenerative braking capability that exceeds the initial regenerative braking capability, inhibit operation of the heating element and the cooling element.

* * * * *